(12) United States Patent
Masumoto et al.

(10) Patent No.: US 11,682,224 B2
(45) Date of Patent: Jun. 20, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Michinori Masumoto, Tokyo (JP); Yusuke Hariya, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 338 days.

(21) Appl. No.: 17/149,743

(22) Filed: Jan. 15, 2021

(65) Prior Publication Data

US 2022/0067362 A1 Mar. 3, 2022

(30) Foreign Application Priority Data

Sep. 2, 2020 (JP) .............................. JP2020-147290

(51) Int. Cl.
| | | |
|---|---|---|
| *G06V 30/00* | (2022.01) | |
| *G06V 30/413* | (2022.01) | |
| *G06F 11/32* | (2006.01) | |
| *G06N 20/00* | (2019.01) | |
| *G06T 7/00* | (2017.01) | |

(52) U.S. Cl.
CPC .......... *G06V 30/413* (2022.01); *G06F 11/327* (2013.01); *G06N 20/00* (2019.01); *G06T 7/0002* (2013.01)

(58) Field of Classification Search
CPC .... G06V 30/413; G06V 10/993; G06V 30/41; G06F 3/0481; G06F 11/327; G06N 20/00; G06N 3/08; G06T 2207/20084; G06T 2207/30168; G06Q 40/123

USPC .......................................................... 382/176
See application file for complete search history.

(56) References Cited

U.S. PATENT DOCUMENTS

| | | | | |
|---|---|---|---|---|
| 11,144,752 | B1* | 10/2021 | Castelblanco Cruz | ..................... G06V 10/758 |
| 11,176,621 | B1* | 11/2021 | McDonald | ........... G06Q 40/123 |
| 2019/0311195 | A1 | 10/2019 | Shimokawa | |

FOREIGN PATENT DOCUMENTS

JP 2019186665 10/2019

* cited by examiner

*Primary Examiner* — Neil R McLean
(74) *Attorney, Agent, or Firm* — JCIPRNET

(57) ABSTRACT

An information processing apparatus includes a memory and a processor configured to acquire an image of a digitized document and execute a first verification process by using image processing using artificial intelligence. The first verification process verifies whether a first requirement is satisfied. The first requirement is a specific requirement among multiple requirements that are required when the acquired image of the document is stored. The processor is also configured to execute a second verification process by using a determination process not using the artificial intelligence. The second verification process verifies whether a second requirement among the multiple requirements is satisfied. The second requirement is other than the first requirement. The processor is also configured to execute the first verification process and the second verification process in parallel and independently from each other and display a processing execution button for executing subsequent processing in response to obtaining a processing result indicating that the first requirement and the second requirement are both satisfied.

20 Claims, 16 Drawing Sheets

| REQUIREMENT ITEM | | DETAILS OF REQUIREMENT | AI PROCESSING |
|---|---|---|---|
| ITEM A | CHECKING IMAGE QUALITY DEFICIENCY (AI PROCESSING) | WHOLE RECEIPT IS TAKEN IN IMAGE. | APPLICABLE |
| | | THERE IS NEITHER BENDING NOR CURL. | |
| | | OBJECT OTHER THAN RECEIPT IS NOT TAKEN IN IMAGE. | |
| | | IMAGE IS NOT BLURRED. | |
| | | MULTIPLE RECEIPTS DO NOT CONSTITUTE ONE IMAGE. | |
| ITEM B | CHECKING IMAGE QUALITY DEFICIENCY (NON-AI PROCESSING) | IMAGE IS NOT MONOCHROME IMAGE (24-BIT COLOR IMAGE IS REQUIRED). | — |
| | | NUMBER OF PIXELS IS 3.88 M OR MORE. | |
| ITEM C | CHECKING AUTOGRAPH | HANDWRITTEN CHARACTERS ARE PRESENT. | APPLICABLE |
| | | HANDWRITTEN CHARACTERS MATCH FULL NAME OF APPLICANT. | |
| ITEM D | CHECKING DATE WITHIN 3 BUSINESS DAYS | TIME STAMP WITHIN 3 BUSINESS DAYS FROM RECEIPT ISSUE DATE IS PROVIDED. | APPLICABLE |

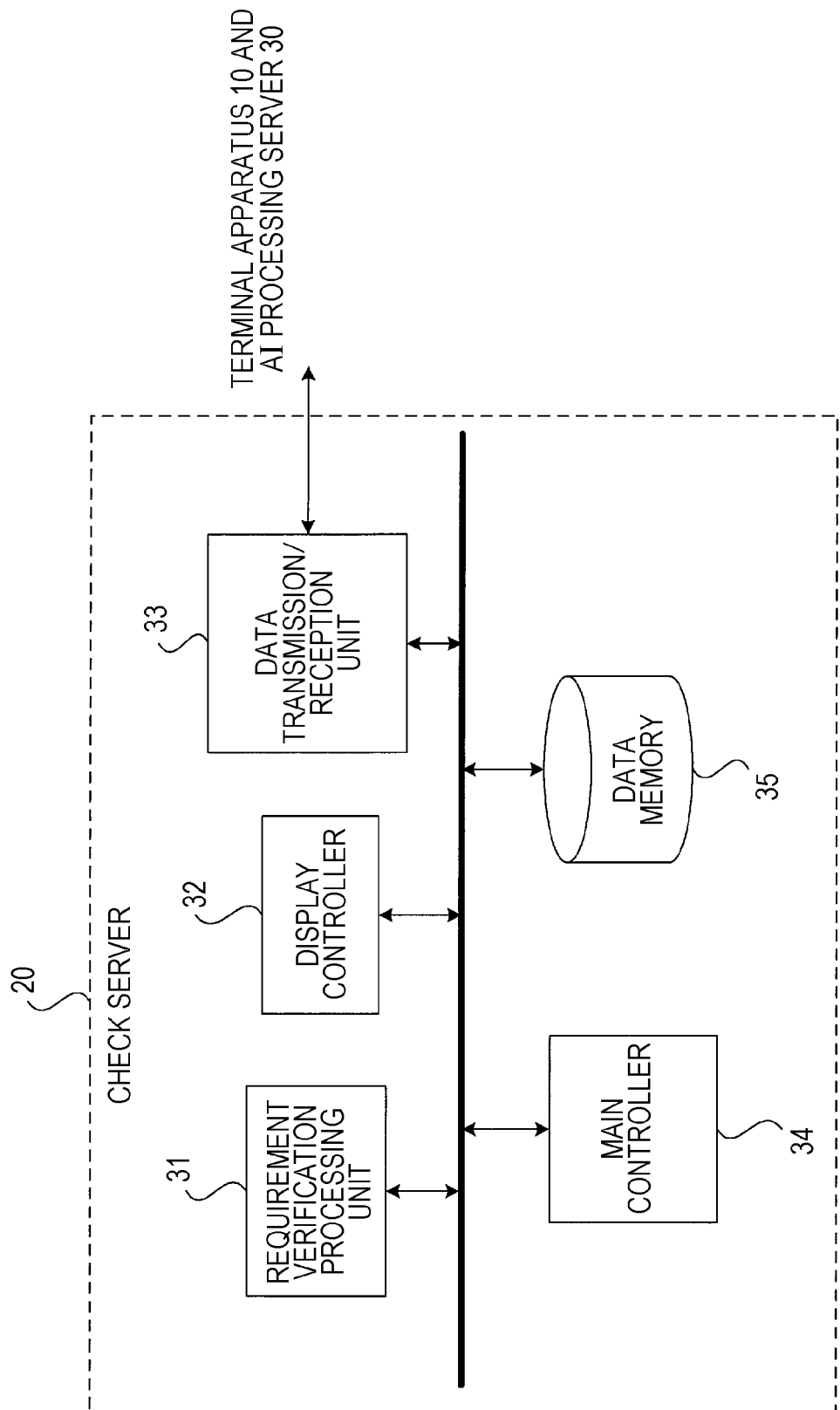

FIG. 4

| REQUIREMENT ITEM | | DETAILS OF REQUIREMENT | AI PROCESSING |
|---|---|---|---|
| ITEM A | CHECKING IMAGE QUALITY DEFICIENCY (AI PROCESSING) | WHOLE RECEIPT IS TAKEN IN IMAGE. | APPLICABLE |
| | | THERE IS NEITHER BENDING NOR CURL. | |
| | | OBJECT OTHER THAN RECEIPT IS NOT TAKEN IN IMAGE. | |
| | | IMAGE IS NOT BLURRED. | |
| | | MULTIPLE RECEIPTS DO NOT CONSTITUTE ONE IMAGE. | |
| ITEM B | CHECKING IMAGE QUALITY DEFICIENCY (NON-AI PROCESSING) | IMAGE IS NOT MONOCHROME IMAGE (24-BIT COLOR IMAGE IS REQUIRED). | — |
| | | NUMBER OF PIXELS IS 3.88 M OR MORE. | |
| ITEM C | CHECKING AUTOGRAPH | HANDWRITTEN CHARACTERS ARE PRESENT. | APPLICABLE |
| | | HANDWRITTEN CHARACTERS MATCH FULL NAME OF APPLICANT. | |
| ITEM D | CHECKING DATE WITHIN 3 BUSINESS DAYS | TIME STAMP WITHIN 3 BUSINESS DAYS FROM RECEIPT ISSUE DATE IS PROVIDED. | APPLICABLE |

…

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-147290 filed Sep. 2, 2020.

BACKGROUND

(i) Technical Field

The present disclosure relates to an information processing apparatus and a non-transitory computer readable medium.

(ii) Related Art

Japanese Unexamined Patent Application Publication No. 2019-186665 discloses an information processing system that prevents processing for storing an invalid document image from being performed. In storing the image of a digitized document, the information processing system compares a recipient who receives a document with an operator who digitizes the document and sets an application deadline varying depending on whether the recipient is identical to or different from the operator.

SUMMARY

Aspects of non-limiting embodiments of the present disclosure relate to an information processing apparatus and a non-transitory computer readable medium that enabled to reduce time taken until the acquisition of processing results of respective verification processes for verifying whether requirement items required in storing an image of a digitized document are satisfied as compared to a case where all of the verification processes are executed by image processing using artificial intelligence.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Information Processing Apparatus

According to an aspect of the present disclosure, there is provided an information processing apparatus including a memory and a processor configured to acquire an image of a digitized document and execute a first verification process by using image processing using artificial intelligence. The first verification process verifies whether a first requirement is satisfied. The first requirement is a specific requirement among multiple requirements that are required when the acquired image of the document is stored. The processor is also configured to execute a second verification process by using a determination process not using the artificial intelligence. The second verification process verifies whether a second requirement among the multiple requirements is satisfied. The second requirement is other than the first requirement. The processor is also configured to execute the first verification process and the second verification process in parallel and independently from each other and display a processing execution button for executing subsequent processing in response to obtaining a processing result indicating that the first requirement and the second requirement are both satisfied.

BRIEF DESCRIPTION OF THE DRAWINGS

An exemplary embodiment of the present disclosure will be described in detail based on the following figures, wherein:

FIG. 3 is a block diagram illustrating the functional configuration of the check server in an exemplary embodiment of the present disclosure;

FIG. 4 is a table illustrating a specific example of requirements based on the Law for Computerized Maintenance of Account Books for which verification processes are executed by a requirement verification processing unit;

DETAILED DESCRIPTION

An exemplary embodiment of the present disclosure will be described in detail with reference to the drawings.

Figure 1:
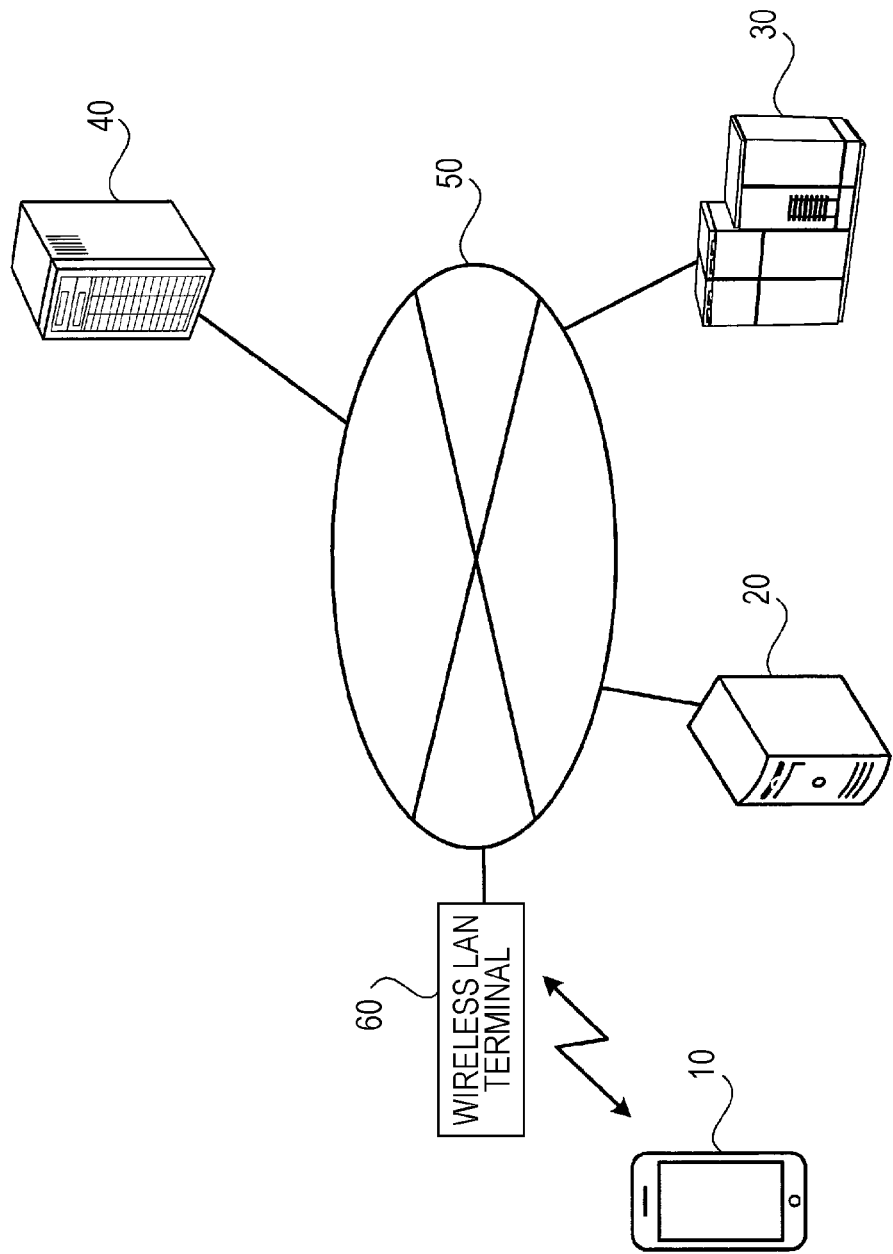
FIG. 1 is a diagram illustrating the system configuration of an information processing system of an exemplary embodiment of the present disclosure.

FIG. 1 is a diagram illustrating the system configuration of an information processing system of the exemplary embodiment of the present disclosure.

As illustrated in FIG. 1, the information processing system of the exemplary embodiment of the present disclosure includes a check server 20, an artificial intelligence (AI) processing server 30, a receipt storage server 40, and a terminal apparatus 10 such as a smartphone that are connected to each other via the Internet 50.

Although FIG. 1 illustrates the configuration in which one terminal apparatus 10 is connected to the Internet 50 via a wireless local area network (LAN) terminal 60, multiple terminal apparatuses 10 are actually connected to the Internet 50 via a mobile communication network and wireless access points.

An information processing system of this exemplary embodiment is a system for digitizing a national-tax-related document such as a receipt and storing the national-tax-related document in the receipt storage server 40. The Law for Computerized Maintenance of Account Books (hereinafter, abbreviated as LCMAB) approves digitizing and storing a national-tax-related document such as a receipt. National-tax-related documents are various documents required to be stored in accordance with tax laws such as the Corporation Tax Law, the Income Tax Law, and the Consumption Tax Law.

The information processing system of this exemplary embodiment enables a user to transmit a receipt image digitized by using the terminal apparatus 10 to the receipt storage server 40, store the receipt image in the receipt storage server 40, and perform processing such as expense payment.

The LCMAB specifies an application deadline to register such a national-tax-related document image. For example, a digitized receipt is required to be stored with a time stamp within a period specified by the law from the date of issue of the receipt (the date of receipt).

Different application deadlines are specified depending on whether an operator who performs an operation for digitizing a document and applies for the storage of the image of the document is a recipient themselves or an agent of the recipient. For example, if the operator is the recipient themselves, the application deadline is a date three days after the date of receipt. If the operator is an agent of the recipient, the application period is one month and seven days from the date of receipt.

The LCMAB requires a recipient to autograph a receipt to store a receipt image digitized by themselves. Specifically, if the recipient applies for the storage by themselves, the receipt image includes autography information such as a signature.

Further, to store a receipt image in accordance with the LCMAB, there are requirements for the image quality, the resolutions, and the like of the image to be stored.

As described above, various requirements based on the LCMAB are required to be satisfied to store a receipt image. A receipt image not satisfying the requirements is not likely to be accepted as a formal document.

The check server 20 is thus provided to execute verification processes for verifying that the requirements based on the LCMAB are satisfied. The verification processes are executed in uploading the digitized receipt image from the terminal apparatus 10 to the receipt storage server 40.

The check server 20 is an information processing apparatus that executes each verification process before uploading a receipt image intended to be uploaded from the terminal apparatus 10 to the receipt storage server 40. The verification process is executed to verify whether the receipt image satisfies the requirements based on the LCMAB. Hereinafter, the requirements based on the LCMAB are simply referred to as LCMAB requirements on occasions.

The AI processing server 30 is a processing apparatus that executes image processing using AI in response to a request from an external apparatus.

Note that the AI is composed of, for example, a neural network and denotes intelligence built up as a trained learning model undergoing machine learning. Specifically, a general machine learning algorithm is used, and machine learning is performed by using correlated input data and output data as training data. A learning model, for example, that estimates output in response to certain input is thereby generated. An output result in response to input data given by the generated learning model is obtained. Intelligence having such a function is called AI.

Deep learning using multilayer neural network is used for a machine learning algorithm implementing AI in some cases. For the algorithm for the deep learning, various methods such as a method using a convolutional neural network and a method using a recurrent neural network are usable.

When verifying whether the LCMAB requirements for the receipt image are satisfied, the check server 20 executes a verification process for verifying whether at least one specific requirement among the LCMAB requirements is satisfied by using processing using the AI. The check server 20 executes the verification process by requesting the AI processing server 30 to execute the verification process for the specific requirement.

A case where a receipt among the national-tax-related documents is digitized and stored is described below in the exemplary embodiment; however, a case where a national-tax-related document other than a receipt is digitized and stored is also applicable to the present disclosure. Further, a case where a document image other than the image of a national-tax-related document is likewise applicable to the present disclosure.

Figure 2:
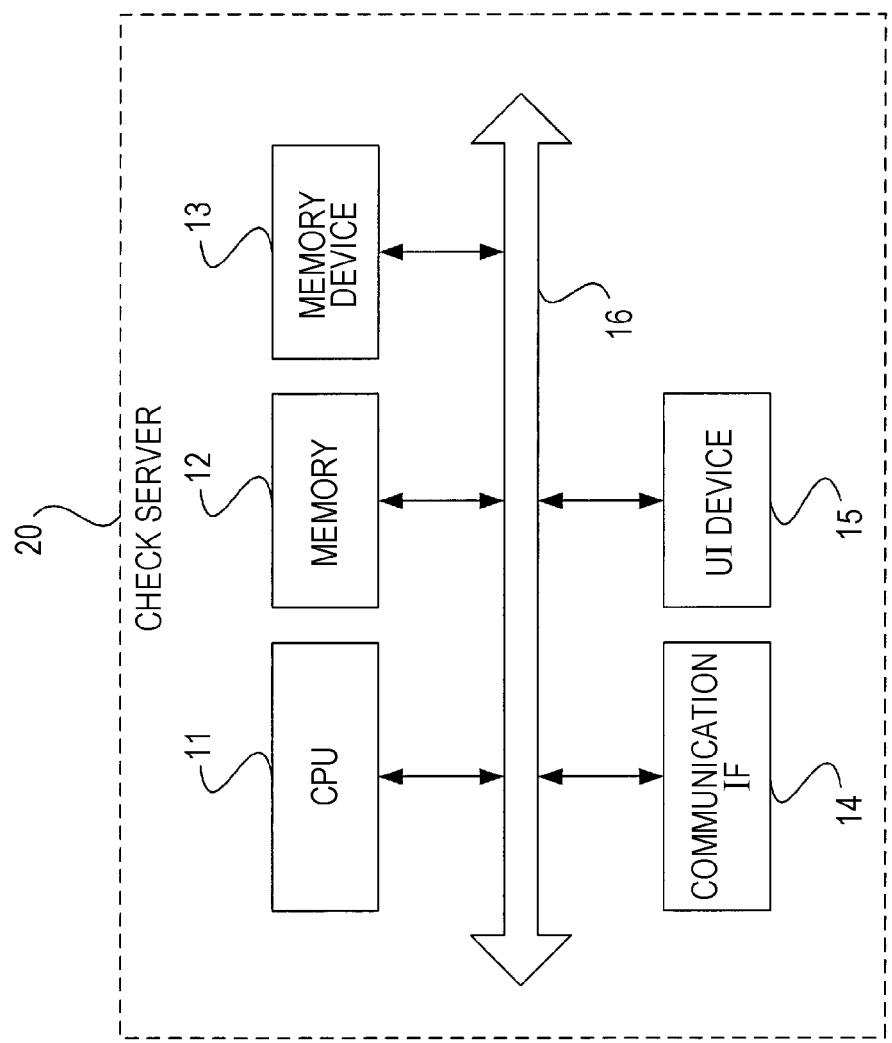
FIG. 2 is a block diagram illustrating the hardware configuration of a check server in an exemplary embodiment of the present disclosure.

FIG. 2 illustrates the hardware configuration of the check server 20 in the information processing system of this exemplary embodiment.

As illustrated in FIG. 2, the check server 20 includes a central processing unit (CPU) 11, a memory 12, a memory device 13 such as a hard disk drive, a communication interface (IF) 14 that transmits and receives data to and from an external apparatus via the Internet 50, and a user interface (UI) device 15 including a liquid crystal display and a keyboard. These components are connected to each other via a control bus 16.

The CPU 11 is a processor that executes a predetermined process in accordance with a control program stored in the memory 12 or the memory device 13 and thereby controls the operation of the check server 20. In the description for this exemplary embodiment, the CPU 11 reads out and runs the control program stored in the memory 12 or the memory device 13 but may be provided with the program stored in a storage medium such as a compact disc read-only memory (CD-ROM).

FIG. 3 is a block diagram illustrating the functional configuration of the check server 20 implemented by running the control program.

As illustrated in FIG. 3, the check server 20 of this exemplary embodiment includes a requirement verification processing unit 31, a display controller 32, a data transmission/reception unit 33, a main controller 34, and a data memory 35.

The data transmission/reception unit 33 transmits and receives data to and from the external apparatuses such as the terminal apparatus 10 and the AI processing server 30. To execute a requirement verification process for a receipt image, the data transmission/reception unit 33 acquires a digitized receipt image from the terminal apparatus 10.

The requirement verification processing unit 31 executes the requirement verification process for verifying whether the receipt image to be uploaded from the terminal apparatus 10 to the receipt storage server 40 satisfies the requirements based on the LCMAB.

Specifically, by using image processing using the AI, the requirement verification processing unit 31 executes the verification process for verifying whether the specific requirement of the requirements among the requirements required in storing the receipt image acquired by the data transmission/reception unit 33 is satisfied. In this exemplary embodiment, the check server 20 executes the verification process by requesting the AI processing server 30 to execute processing using the AI. The requirement verification processing unit 31 thus verifies whether the requirement is satisfied by requesting the AI processing server 30 to execute the image processing using the AI on the receipt image acquired by the data transmission/reception unit 33 and by receiving the processing result from the AI processing server 30.

In contrast, by using a determination process not using the AI, the requirement verification processing unit 31 executes a verification process for verifying whether a requirement other than the requirement verified by using the AI is satisfied.

The requirement verification processing unit 31 executes the verification process using the AI by using the AI processing server 30 but executes the verification process not using the AI by itself. In other words, the requirement verification processing unit 31 executes the verification process using the AI and the verification process not using the AI in parallel and independently from each other.

The requirement determined by using the AI includes at least one of, for example, the requirements that the acquired receipt image has the autograph of an applicant, a predetermined number of days, for example, three business days have not passed since the date of issue of the receipt, and the receipt image is not deficient. The requirement to be determined without using the AI includes at least one of, for example, the requirements that the number of pixels of the acquired receipt image is a predetermined value or more and the receipt image is not a monochrome image.

FIG. 4 illustrates a specific example of the requirements based on the LCMAB undergoing the verification processes by the requirement verification processing unit 31.

With reference to FIG. 4, requirements as four items A to D are illustrated as the requirements from the LCMAB. The requirement as the item A is checking image quality deficiency (AI processing), and the requirements "the whole receipt is taken in the image", "there is neither bending nor curl", "an object other than the receipt is not taken in the image", "the image is not blurred", and "multiple receipts do not constitute one image" are specified as the specific details of the requirement. For the requirement as the item A, the AI processing using the AI is executed.

The requirement as the item B is checking image quality deficiency (non-AI processing), and the requirements "the image is not a monochrome image (a 24-bit color image is required)" and "the number of pixels is 3.88 M or more" are specified as the specific details of the requirement. The requirement as the item B is determinable without using the AI. This is because whether the image is a monochrome image or a color image may be easily determined from the data structure, and the number of pixels may also be determined by multiplying the length of the image by the width. Accordingly, the requirement verification processing unit 31 does not have to take the trouble to request the AI processing server 30 to determine whether the requirement as the item B is satisfied in the verification process and thus executes the verification process by itself.

The requirement as the item C is checking autograph and the requirements "handwritten characters are present" and "handwritten characters match the full name of the applicant" are specified as the specific details of the requirement. It is difficult to perform character recognition of a handwritten character part extracted from the receipt image unless the image processing using the AI is executed. For the requirement as the item C, the AI processing using the AI is thus executed.

The requirement as the item D is checking a date within three business days and the requirement "a time stamp within three business days from the receipt issue date is provided" is specified as a specific detail of the requirement. A receipt issuance date is often handwritten and is written in various formats such as Aug. 11, 2020 and Jul. 10, 2020. It is thus difficult to find the receipt issue date in the receipt image unless the image processing using the AI is executed. Accordingly, for the requirement as the item D, the AI processing using the AI is also executed.

The display controller 32 controls the content of the displaying by the terminal apparatus 10. The display controller 32 performs control to display a processing execution button for executing subsequent processing on the display screen of the terminal apparatus 10. The processing execution button is displayed in response to obtaining a processing result indicating that the requirement determined by using the AI and the requirement determined without using the AI are both satisfied in the verification process for verifying whether the LCMAB requirements for the receipt image are satisfied.

The main controller 34 controls the overall operation of the check server 20. The main controller 34 performs various control operations such as storing, in the data memory 35, the receipt image received by the data transmission/reception unit 33 from the terminal apparatus 10 and controlling the operation of the display controller 32 on the basis of the result of the verification by the requirement verification processing unit 31.

If a processing result indicating that one of the requirements determined by using the AI and without using the AI is not satisfied is obtained, the display controller 32 displays the details of the not satisfied requirement on the display screen of the terminal apparatus 10 and a forced execution button for forcibly executing the subsequent processing and thereby enables forced upload.

The forced execution button is displayed as described above, and thereby the subsequent processing is allowed to be executed in accordance with the determination by the user. This is based on the following reasons.

First, there is a possibility that the verification process using the AI has a wrong determination result. If the user visually checks and determines no deficiency, uploading the receipt image at the user's own discretion is considered to cause no trouble. Since the image processing using the AI has improved accuracy by performing supervised learning using a large number of pieces of data, it is conceivable that insufficient learning has low determination accuracy.

In addition, even if a requirement is not satisfied at present, the requirement may be satisfied in later processing. If the user knows such a requirement, and even if the requirement is not satisfied at present, uploading the receipt image is considered to cause no trouble.

For example, even if the requirement that a time stamp within three days from the date of issue is provided is not satisfied at present, but if a third party approver approves the application later, the requirement is satisfied. Accordingly, even though the requirement that a time stamp within three days from the date of issue is provided is not satisfied at present, allowing forced upload enables an approver to approve the application later.

If a processing result indicating that the requirement determined by using the AI is satisfied but the requirement determined without using the AI is not satisfied is obtained, the display controller 32 may display the details of the unsatisfied requirement without displaying the forced execution button for executing the subsequent processing. If a processing result indicating that the requirement determined without using the AI is satisfied but the requirement determined by using the AI is not satisfied is obtained, the display controller 32 may display the details of the unsatisfied requirement and display the forced execution button for executing the subsequent processing.

The configuration is based on the following reason. The requirement determined without using the AI, for example, the requirement as the item B illustrated in FIG. 4, such as the requirements that the receipt image is a monochrome image and the number of pixels is 3.88 M or more, are almost unlikely to be determined wrongly, and there is no possibility that the requirement is satisfied in the later processing.

That is, allowing a receipt image not satisfying a requirement determined without using the AI to be forcibly uploaded causes the receipt image not satisfying the requirement to be uploaded to the receipt storage server 40 and stored therein.

The display controller 32 thus may perform control not to display the forced execution button allowing forced upload if the requirement determined without using the AI is not satisfied.

Note that when the displayed forced execution button is operated, the display controller 32 does not allow the forced upload immediately. The display controller 32 displays an alert screen and a confirmation button. The alert screen is used to report, to the user, a situation possibly occurring if the subsequent processing such as upload of a deficient receipt image is executed. The confirmation button is used to confirm that the user intends to execute the subsequent processing.

When the user operates the displayed confirmation button after looking at the alert screen, the subsequent processing such as the forced upload is allowed to be executed.

The operations of the information processing system in this exemplary embodiment will be described in detail with reference to the drawings.

Figure 5:
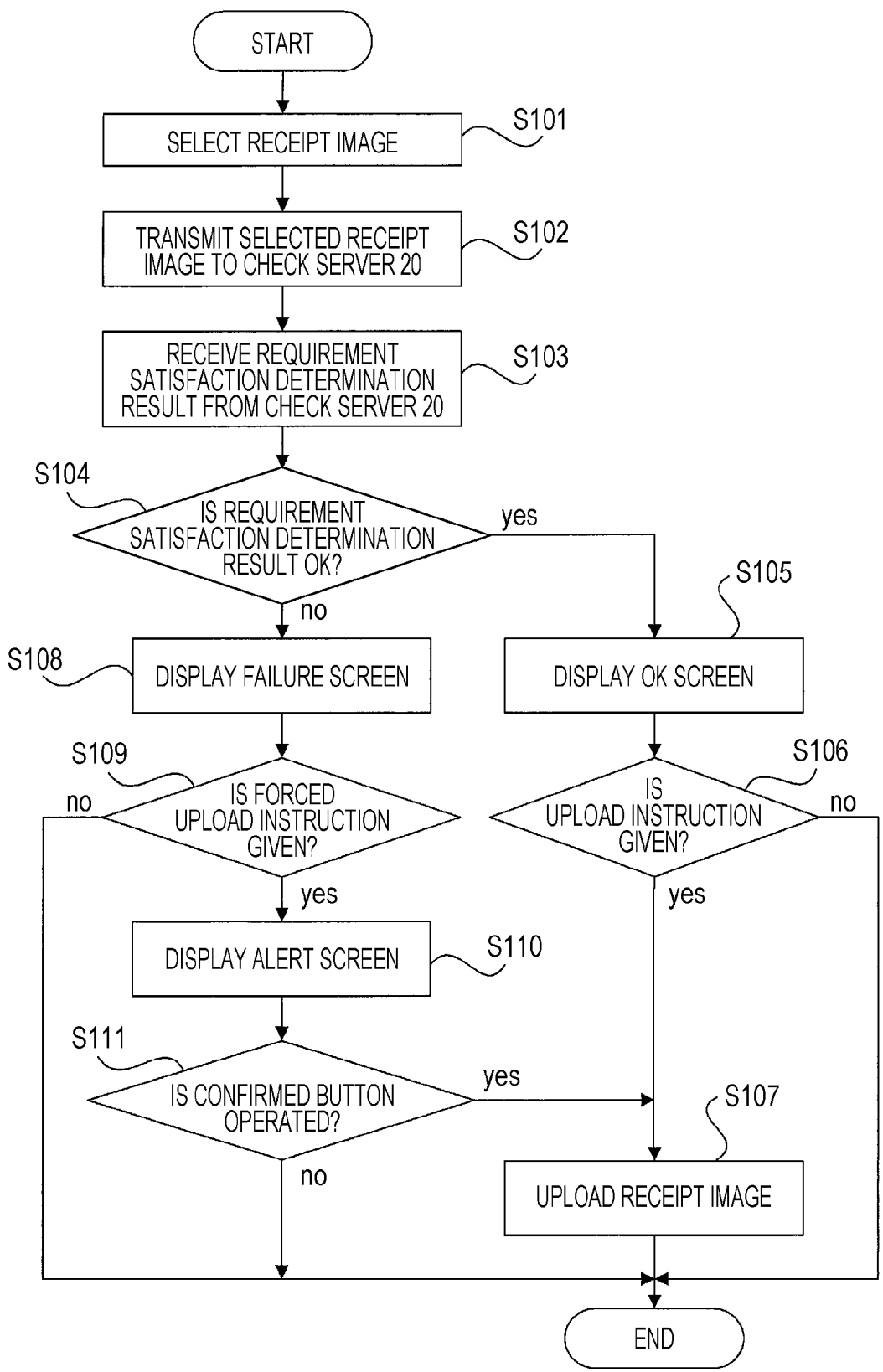
FIG. 5 is a flowchart for explaining operations of a terminal apparatus.

First, the operations of the terminal apparatus 10 will be described with reference to a flowchart in FIG. 5. FIGS. 6 to 12 illustrate specific examples of the content of the displaying by the terminal apparatus 10.

Figure 6:
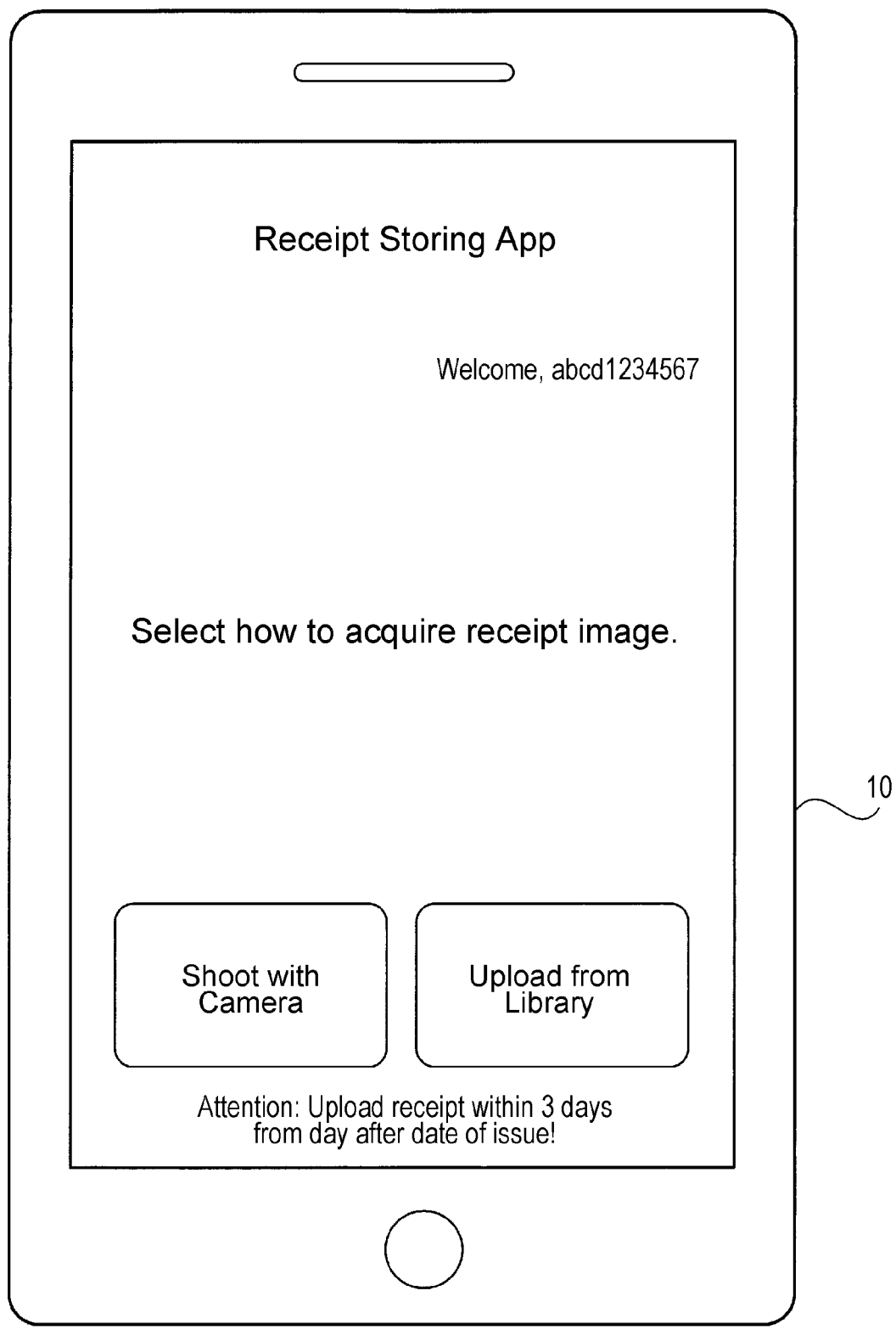
FIG. 6 is a view illustrating an example display screen displayed when a user is prompted to select a receipt image to be displayed on the terminal apparatus.

First, to store the image of a receipt, the terminal apparatus 10 displays the display screen as described in FIG. 6 to request the user to select a receipt image in step S101.

In FIG. 6, the operation buttons "Shoot with Camera" and "Upload from Library" are displayed on the display screen of the terminal apparatus 10.

When the operation button "Shoot with Camera" is operated, the terminal apparatus 10 starts the camera, shoots a new image of a receipt, and thereby acquires a receipt image. When the operation button "Upload from Library" is operated, a receipt image to be uploaded to the receipt storage server 40 is selected from images acquired in the past.

Figure 7:
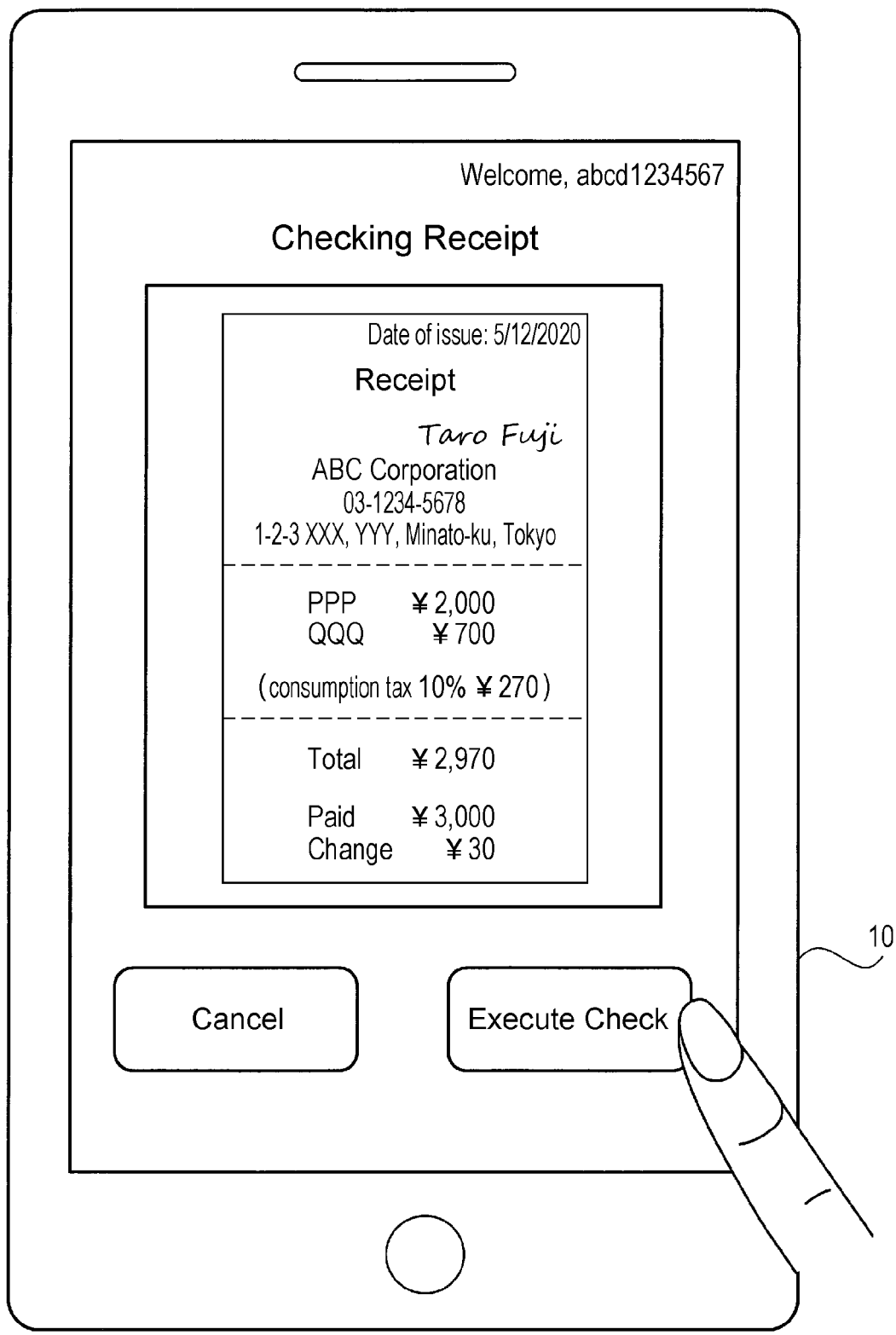
FIG. 7 is a view illustrating an example display screen displayed on the terminal apparatus after a receipt image is selected.

FIG. 7 illustrates an example display screen of the terminal apparatus 10 displayed after a receipt image is selected by one of the methods as described above. With reference to FIG. 7, the selected receipt image is displayed together with the Execute check button. If the user operates the Execute check button, the terminal apparatus 10 transmits the selected receipt image to the check server 20 in step S102.

Figure 8:
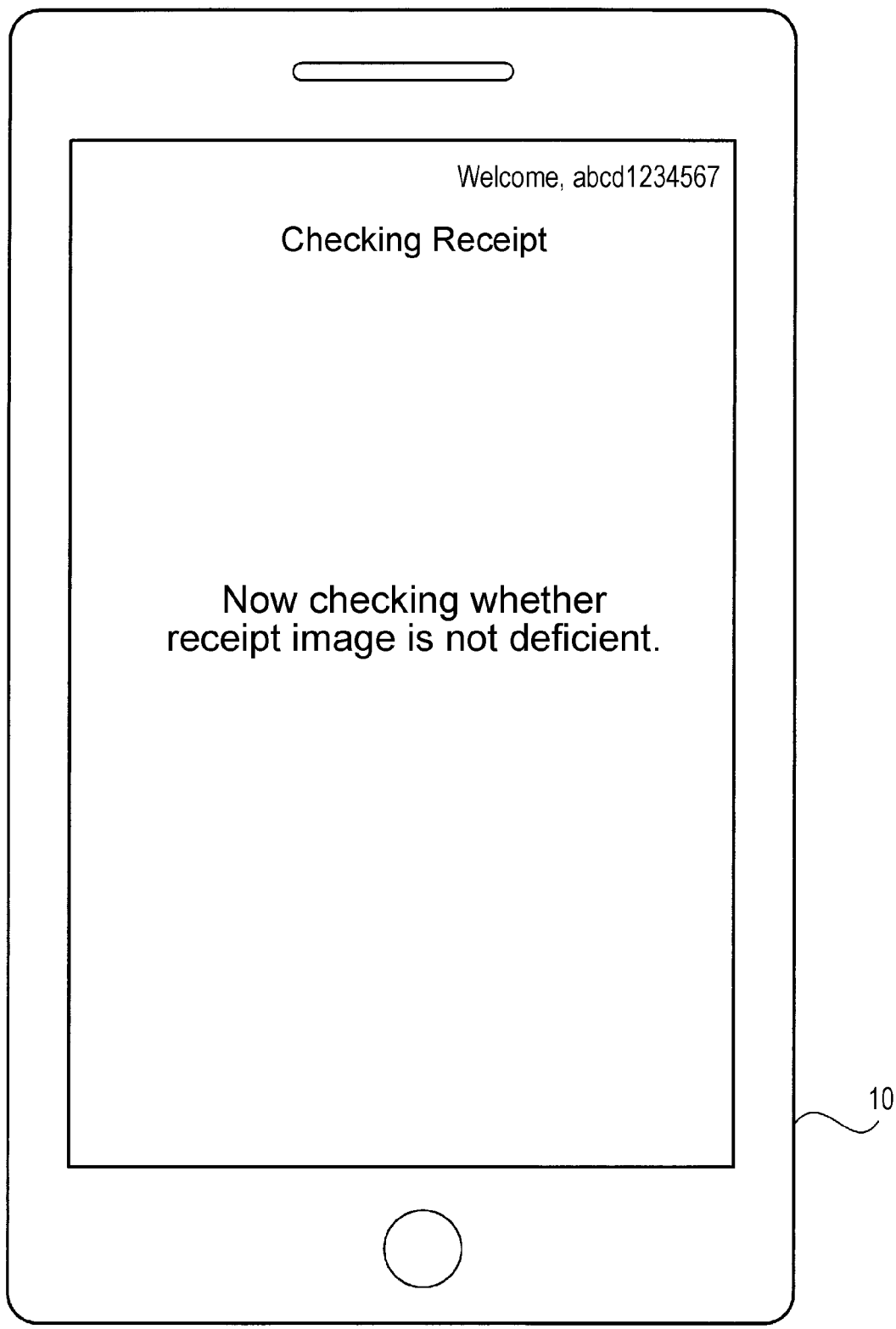
FIG. 8 is a view illustrating an example display screen displayed at the time of reporting to the user that a verification process for a receipt image is being executed.

The terminal apparatus 10 then displays the display screen as illustrated in FIG. 8 and reports to the user that the verification processes for the receipt image are being executed.

Meanwhile, the check server 20 executes a requirement satisfaction determination process for verifying whether the transmitted receipt image satisfies the LCMAB requirements. The details of the operation will be described later.

After the check server 20 terminates the requirement satisfaction determination process, the terminal apparatus 10 receives a requirement satisfaction determination result from the check server 20 in step S103.

In step S104, the terminal apparatus 10 verifies whether the requirement satisfaction determination result is OK, that is, the requirements are determined to be satisfied, or the requirement satisfaction determination result is Failure, that is, the requirements are determined to be not satisfied.

Figure 9:
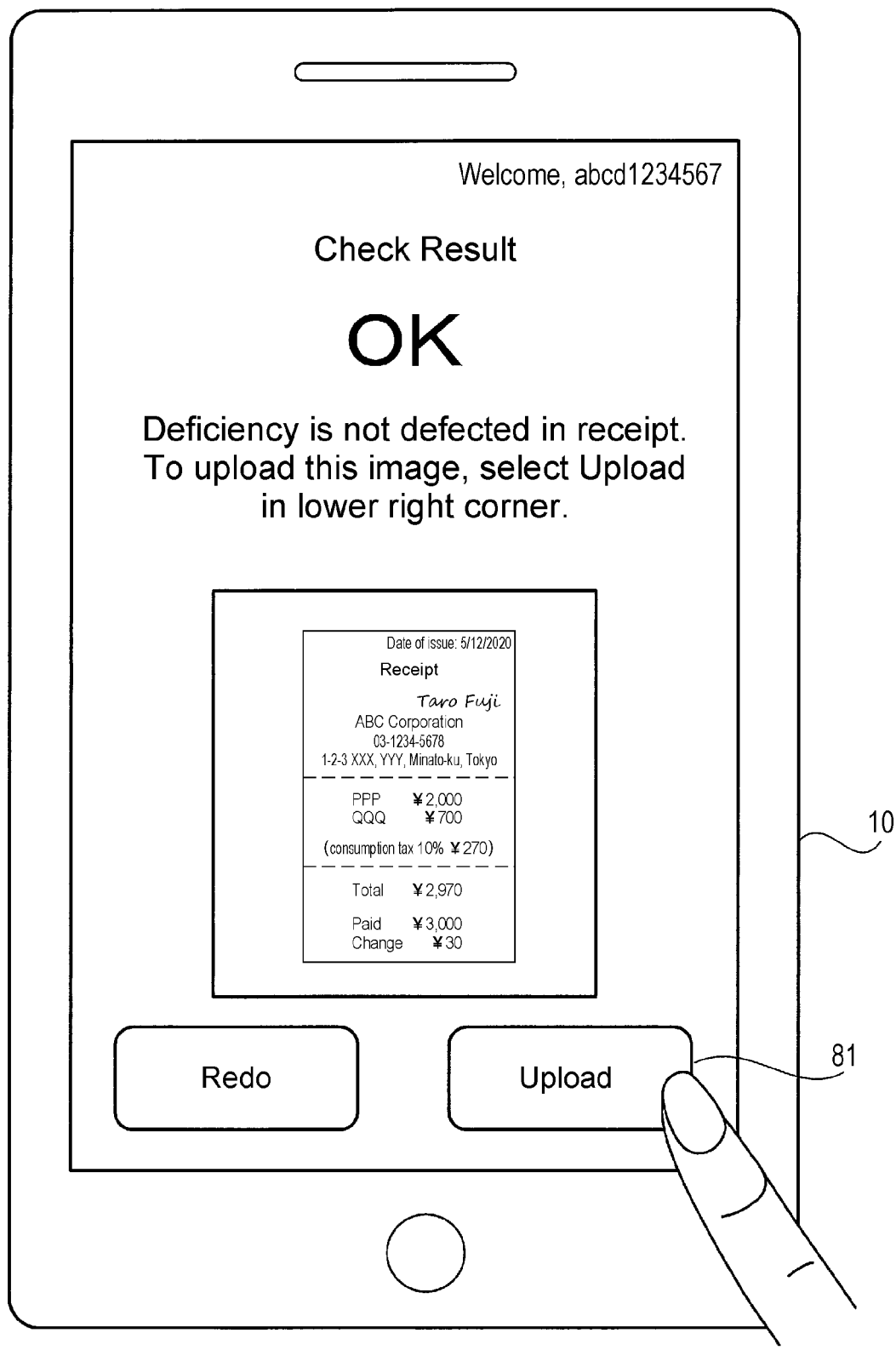
FIG. 9 is a view illustrating an example of an OK screen displayed when the requirement satisfaction determination result is OK.

If the requirement satisfaction determination result is OK in step S104, the terminal apparatus 10 displays the OK screen as illustrated in FIG. 9 in step S105.

In the example display screen illustrated in FIG. 9, an Upload button 81 is displayed on the display screen. If it is determined that the user operates the Upload button 81 to give an upload instruction in step S106, the terminal apparatus 10 uploads the receipt image to the receipt storage server 40 in step S107.

Figure 10:
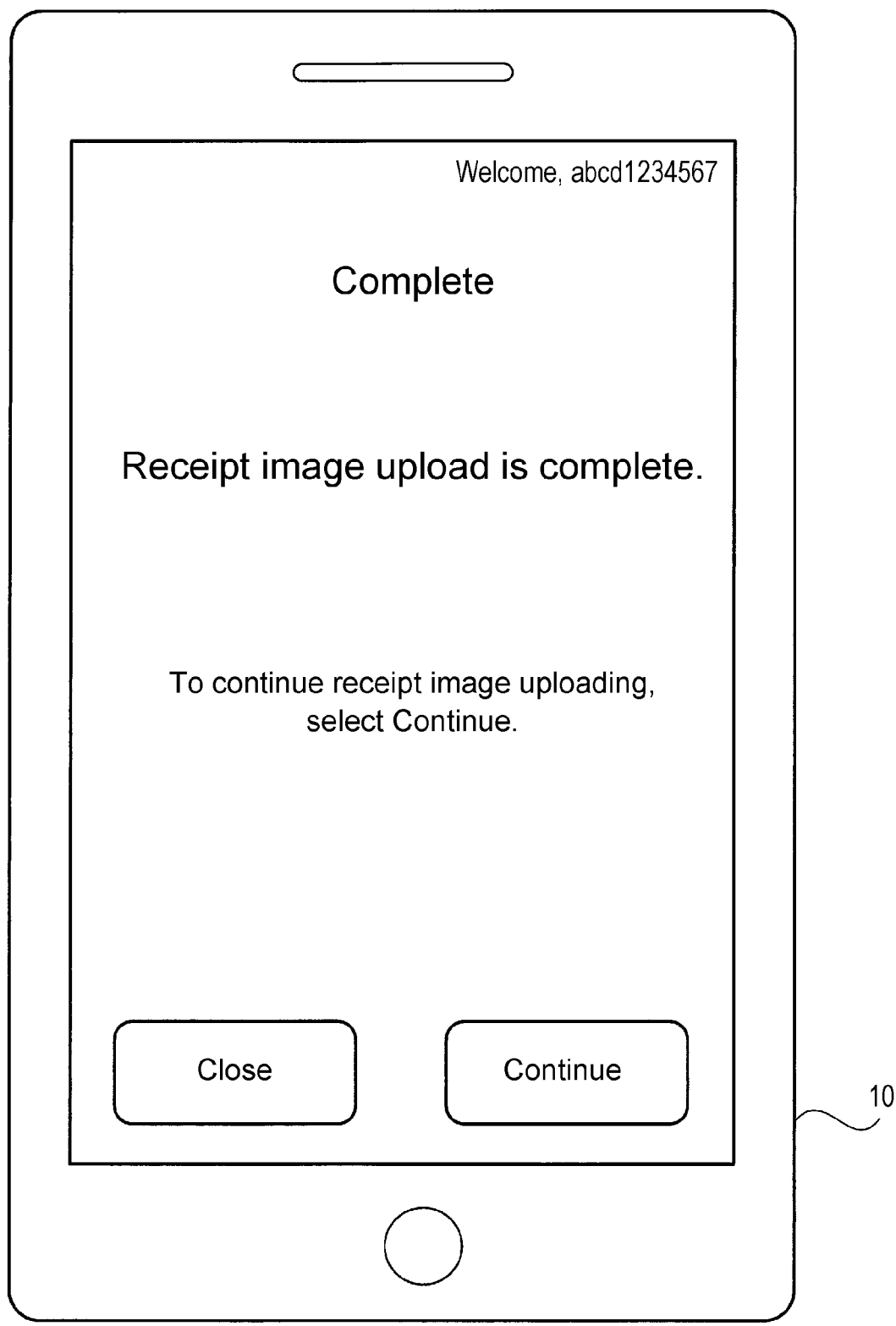
FIG. 10 is a view illustrating an example completion screen for reporting to the user that receipt image upload is complete.

After uploading the receipt image is complete, the terminal apparatus 10 displays a completion screen for reporting to the user that uploading the receipt image is complete, as illustrated in FIG. 10.

If it is determined that the user does not give an upload instruction in step S106 because they operates the Redo button, the terminal apparatus 10 terminates the processing.

Figure 11:
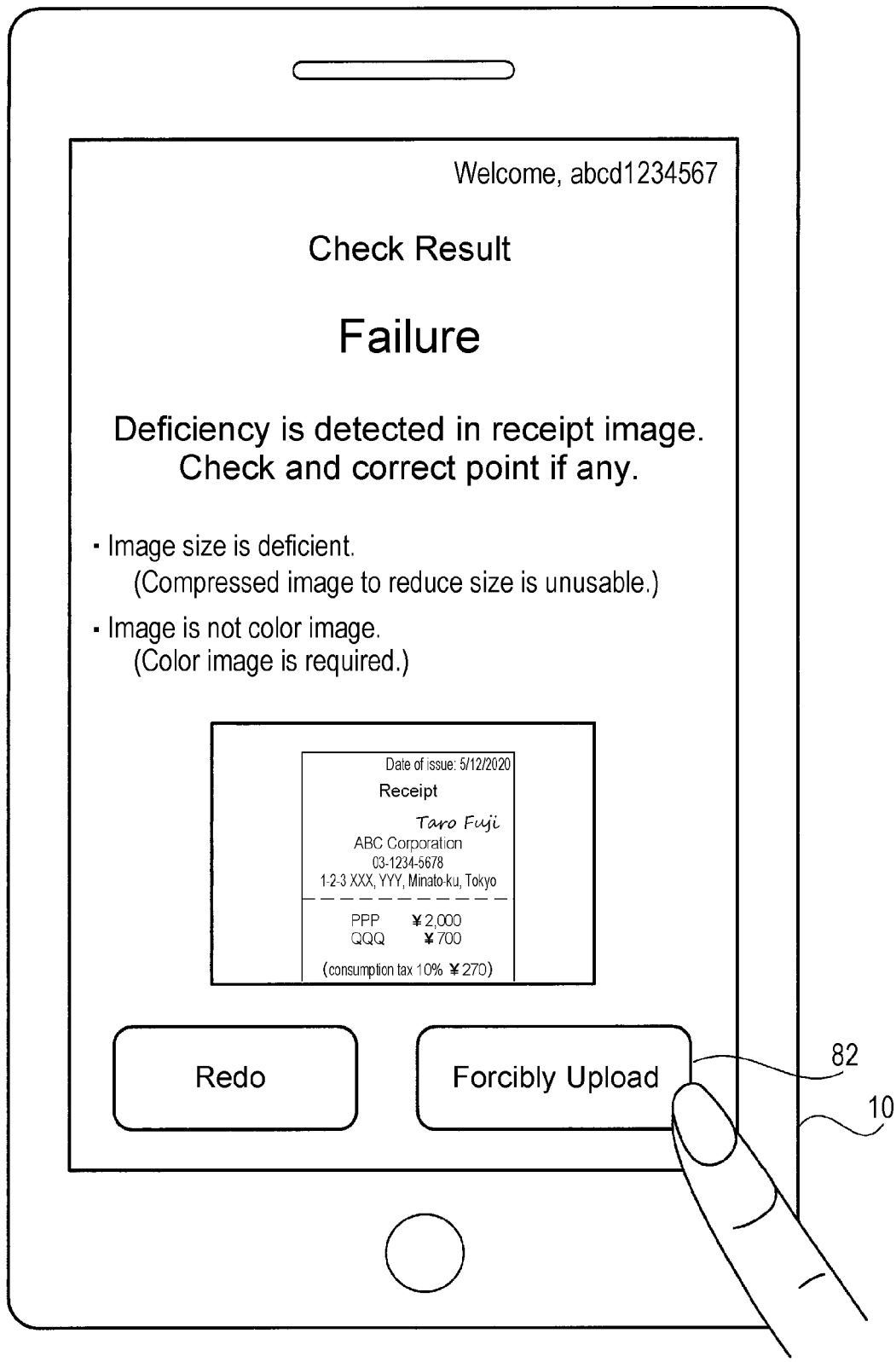
FIG. 11 is a view illustrating an example of a Failure screen displayed when the requirement satisfaction determination result is Failure.

If the requirement satisfaction determination result is Failure in step S104, the terminal apparatus 10 displays the Failure screen as illustrated in FIG. 11 in step S108.

On the example display screen illustrated in FIG. 11, the details of the unsatisfied requirement as well as a Forcibly upload button 82 are displayed.

Specifically, messages "Image size is deficient." and "Image is not color image." are displayed to thereby report that the receipt image intended to be uploaded by the user does not satisfy the requirement for the number of pixels and the requirement that the image is not a monochrome image.

Figure 12:
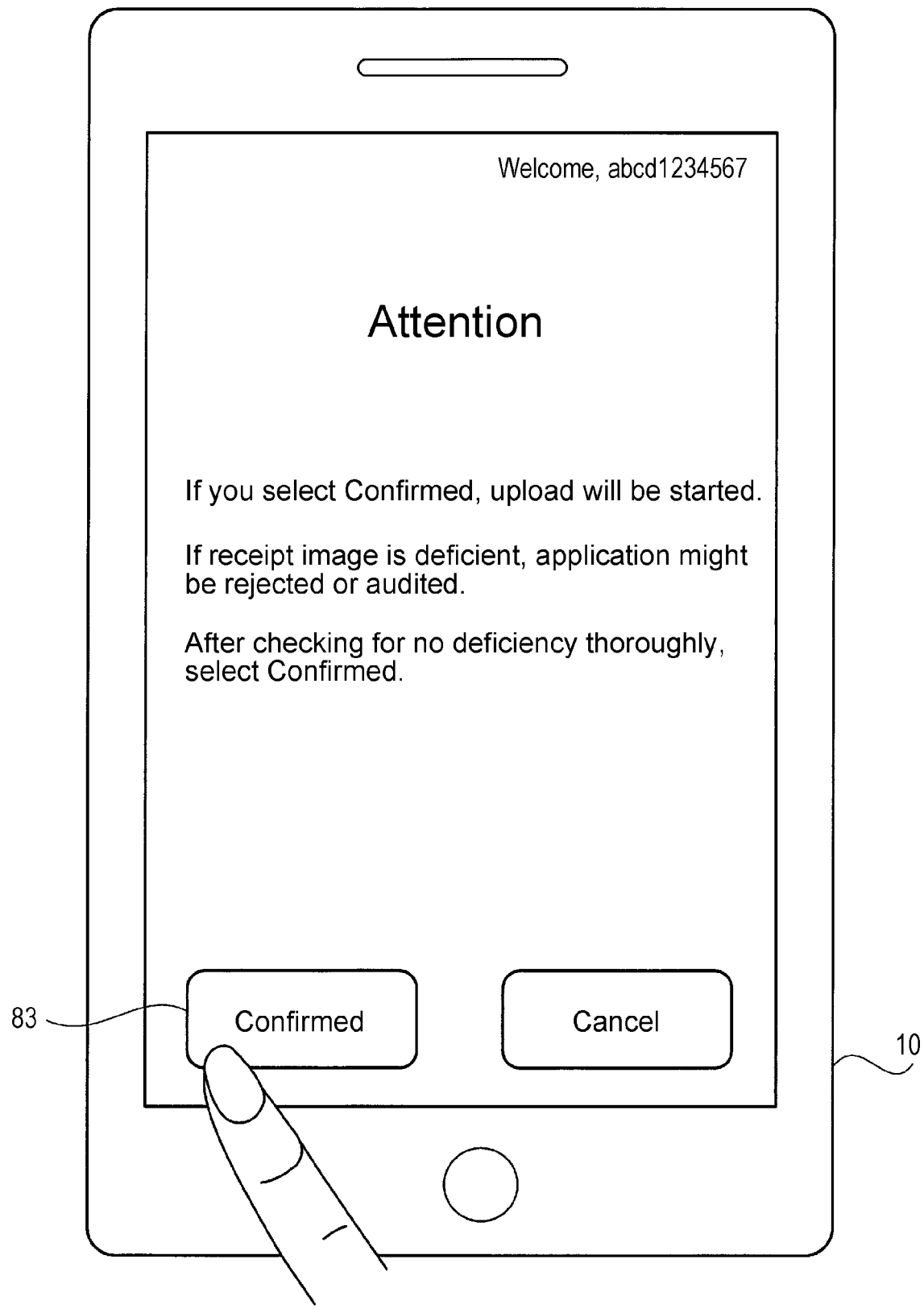
FIG. 12 is a view illustrating an example alert screen displayed on the terminal apparatus.

If it is determined in step S109 that the user gives a forced upload instruction by operating the Forcibly upload button 82, the terminal apparatus 10 displays the alert screen as illustrated in FIG. 12 in step S110.

In the example display screen illustrated in FIG. 12, situations possibly occurring if the deficient receipt image is forcibly uploaded are reported to the user, and a Confirmed button 83 is displayed on the display screen.

If it is determined in step S111 that the user operates the Confirmed button 83, the terminal apparatus 10 uploads the receipt image to the receipt storage server 40 in step S107.

If it is determined that the user operates the Cancel button to stop the forced upload of the receipt image in step S111, the terminal apparatus 10 terminates the processing.

Figure 13:
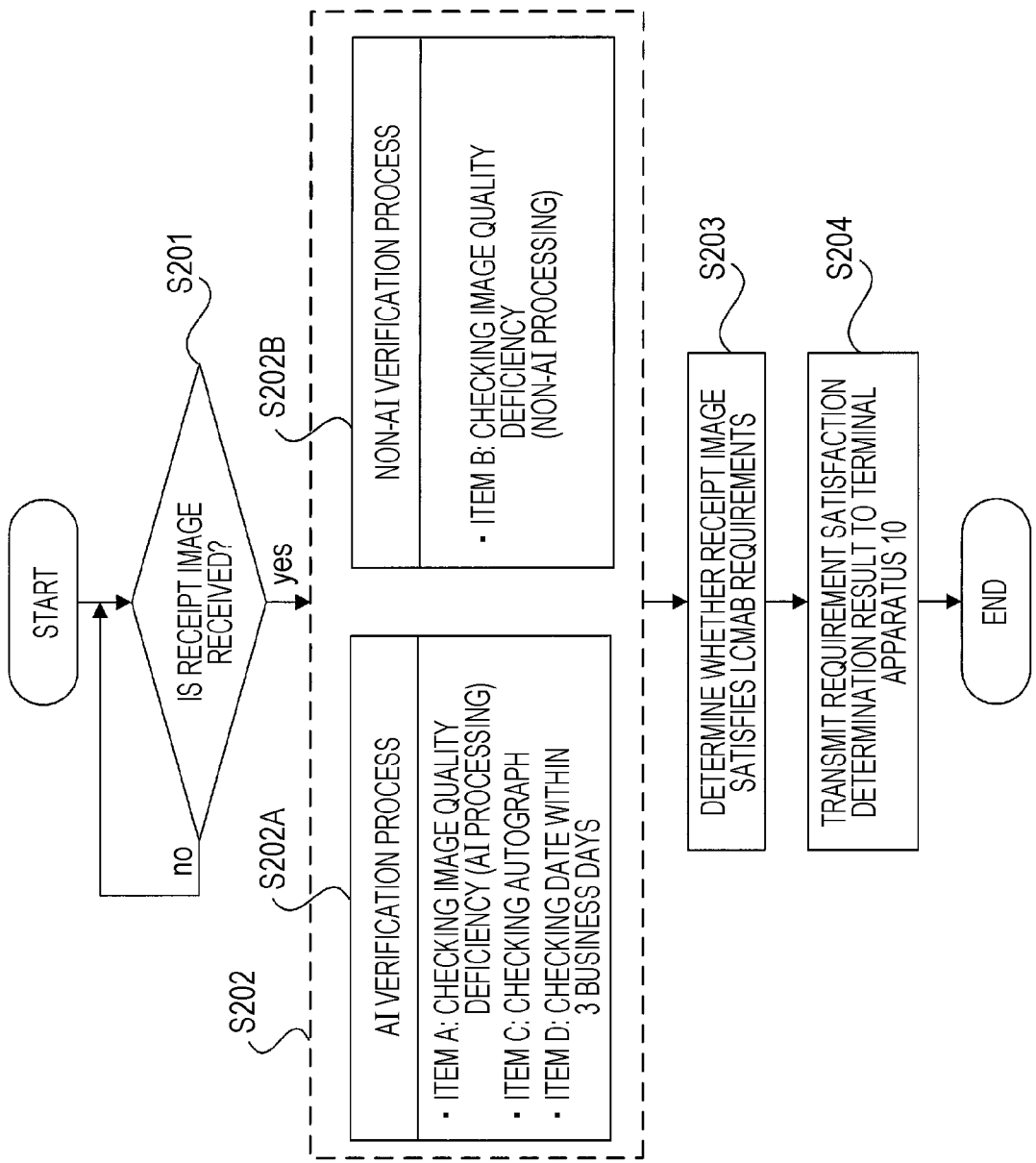
FIG. 13 is a flowchart for explaining operations of the check server at the time of executing the verification processes.

The operations of the check server 20 at the time of executing the verification processes as described above will be described with reference to a flowchart in FIG. 13.

If the check server 20 receives the receipt image from the terminal apparatus 10 in step S201, the check server 20 executes the verification process for verifying whether the received receipt image satisfies the LCMAB requirements in step S202. Specifically, the requirement verification processing unit 31 of the check server 20 verifies whether the received receipt image satisfies the requirements as illustrated in FIG. 4.

The requirement verification processing unit 31 executes a verification process (step S202A) using the AI processing and a verification process (step S202B) using the non-AI processing in parallel and independently from each other.

In the verification process using the AI processing illustrated in step S202A, whether the requirements as the items A, C, and D of the requirements illustrated in FIG. 4 are satisfied is verified. In the verification process illustrated in step S202B using the non-AI processing, whether the requirement as the item B of the requirements illustrated in FIG. 4 is satisfied is verified.

Note that for the verification process using the AI processing illustrated in step S202A, the requirement verification processing unit 31 verifies whether the requirements are satisfied by requesting the AI processing server 30 to perform the AI processing and then by receiving the processing result. For the verification process using the non-AI processing illustrated in step S202B, the requirement verification processing unit 31 executes the verification process by itself to verify whether the requirement is satisfied.

After the verification processes in step S202 are terminated, the requirement verification processing unit 31 comprehensively determines in step S203 whether the receipt image acquired from the terminal apparatus 10 satisfies all of the LCMAB requirements therefor.

In step S204, the determination result is transmitted from the check server 20 to the terminal apparatus 10.

Figure 14:
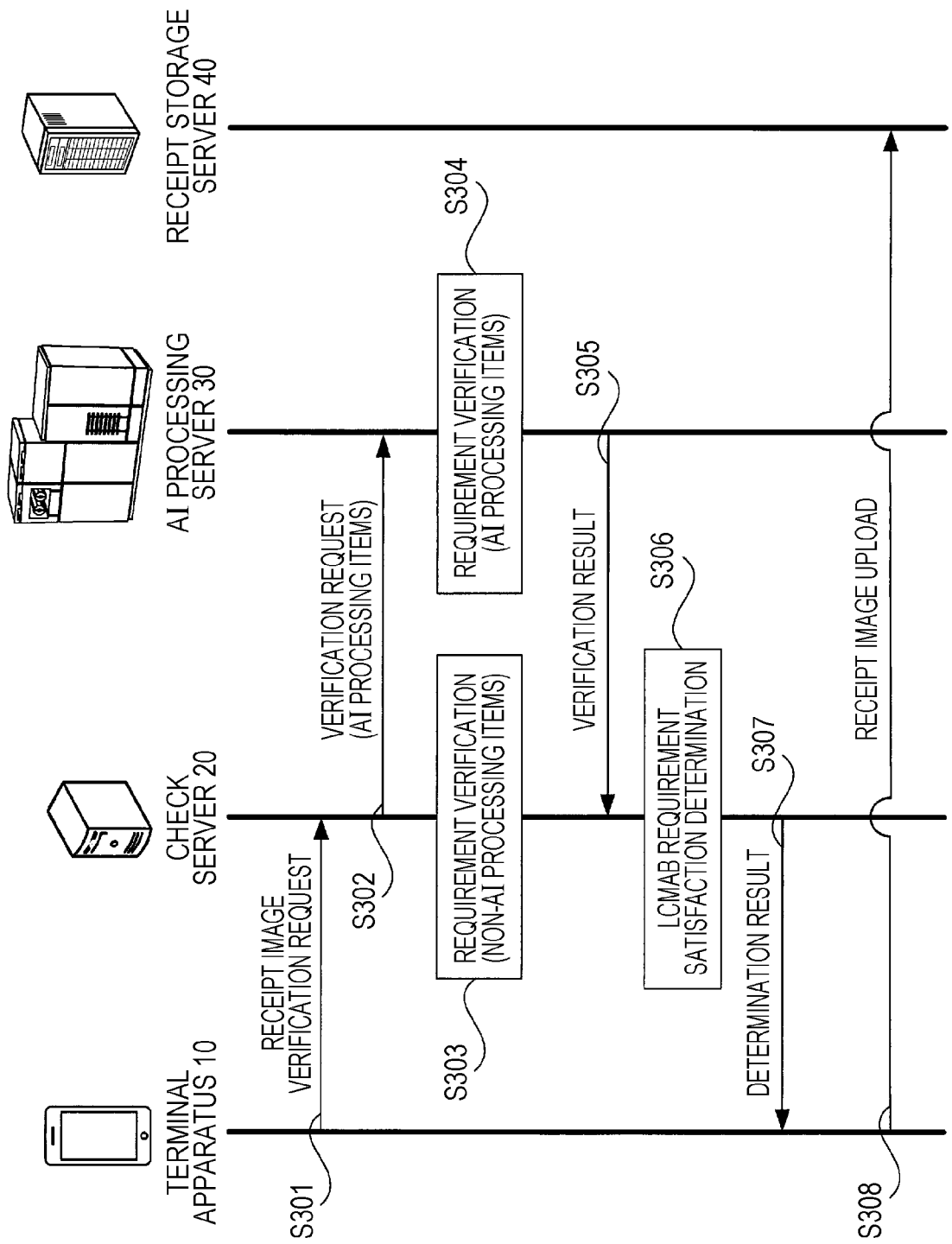
FIG. 14 is a sequence chart for explaining how data is transmitted and received among the terminal apparatus, the check server, an artificial intelligence (AI) processing server, and a receipt storage server.

How data is transmitted and received among the terminal apparatus 10, the check server 20, the AI processing server 30, and the receipt storage server 40 will be described with reference to a sequence chart in FIG. 14.

First, in step S301, a request for receipt image verification is transmitted from the terminal apparatus 10 to the check server 20. In step S302, the check server 20 transmits, to the AI processing server 30, a verification request for verifying whether the requirements as the items A, C, and D for the verification process using the AI are satisfied.

In step S303, the check server 20 executes the verification process for verifying whether the requirement as the item B for the verification process without using the AI is satisfied. In step S304, the AI processing server 30 receiving the verification request from the check server 20 executes the verification process for verifying whether the requirements as the items A, C, and D using the AI processing are satisfied.

That is, the verification process for the requirement using the non-AI processing is executed by the check server 20, and the verification process for the requirements using the AI processing is executed by the AI processing server 30. The verification processes are executed by the respective servers in parallel and independently from each other.

After the verification process using the AI processing for verifying whether the receipt image satisfies the requirements is terminated, the AI processing server 30 transmits the verification result to the check server 20 in step S305.

In step S306, the check server 20 comprehensively determines whether the receipt image acquired from the terminal apparatus 10 satisfies all the LCMAB requirements therefor.

In step S307, the check server 20 transmits the determination result to the terminal apparatus 10.

If the determination result is that the receipt image satisfies all the LCMAB requirements, or if the user selects forced upload, the terminal apparatus 10 uploads the receipt image to the receipt storage server 40 in step S308.

The processing as described above is executed, and thereby the receipt image after verifying whether the requirements based on the LCMAB are satisfied is stored in the receipt storage server 40 in the information processing system of this exemplary embodiment. When being viewed through access from an external apparatus, the receipt image stored in the receipt storage server 40 may be displayed with an indicator indicating that the verification process using the AI processing has been executed.

In the exemplary embodiment described above, even if the receipt image does not satisfy the specific requirement among the LCMAB requirements, the forced upload is allowed with the Forcibly upload button 82 being displayed on the display screen of the terminal apparatus 10.

However, if a receipt image not satisfying the requirements due to deficiency not corrected in processing or a procedure to be performed later is stored, the receipt image is not likely to be accepted as a legally formal receipt image.

In particular, a requirement as the item for the verification process using the non-AI processing is less likely to be determined wrongly because the criteria for the item are that the image is whether a monochrome or color image and the number of pixels is a predetermined value or more. If forced upload is allowed even in a case where the requirement as the determination item as described above is not satisfied, a deficient receipt image may possibly be stored.

Accordingly, the display controller 32 of the check server 20 may be configured not to display the Forcibly upload button 82 if the requirements verified using the AI processing are satisfied but if the requirement verified using the non-AI processing is not satisfied. In this case, if the requirements verified using the AI processing are not satisfied, and if the requirement verified using the non-AI processing is not satisfied either, the display controller 32 does not display the Forcibly upload button 82 as a matter of course.

Further, even in this case, if the requirements verified using the AI processing are not satisfied, but if the requirement verified using the non-AI processing is satisfied, the display controller 32 performs control to display the Forcibly upload button 82.

Figure 15:
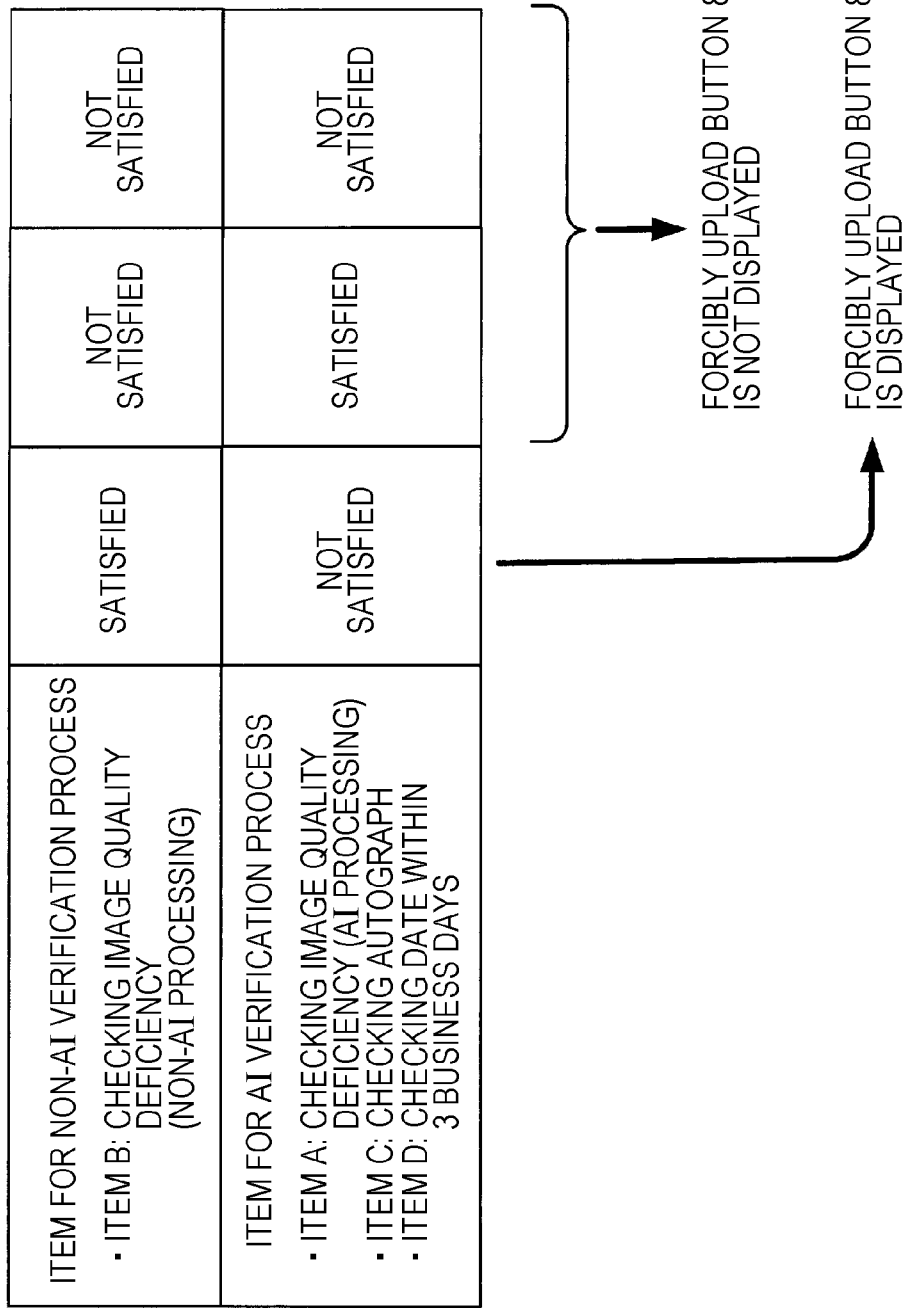
FIG. 15 is a view illustrating a criteria list for switching between displaying and not displaying a Forcibly upload button depending on whether a requirement verified using non-AI processing is satisfied.

FIG. 15 illustrates a list for switching between the displaying and not displaying the Forcibly upload button 82 on the basis of the criteria as described above.

Figure 16:
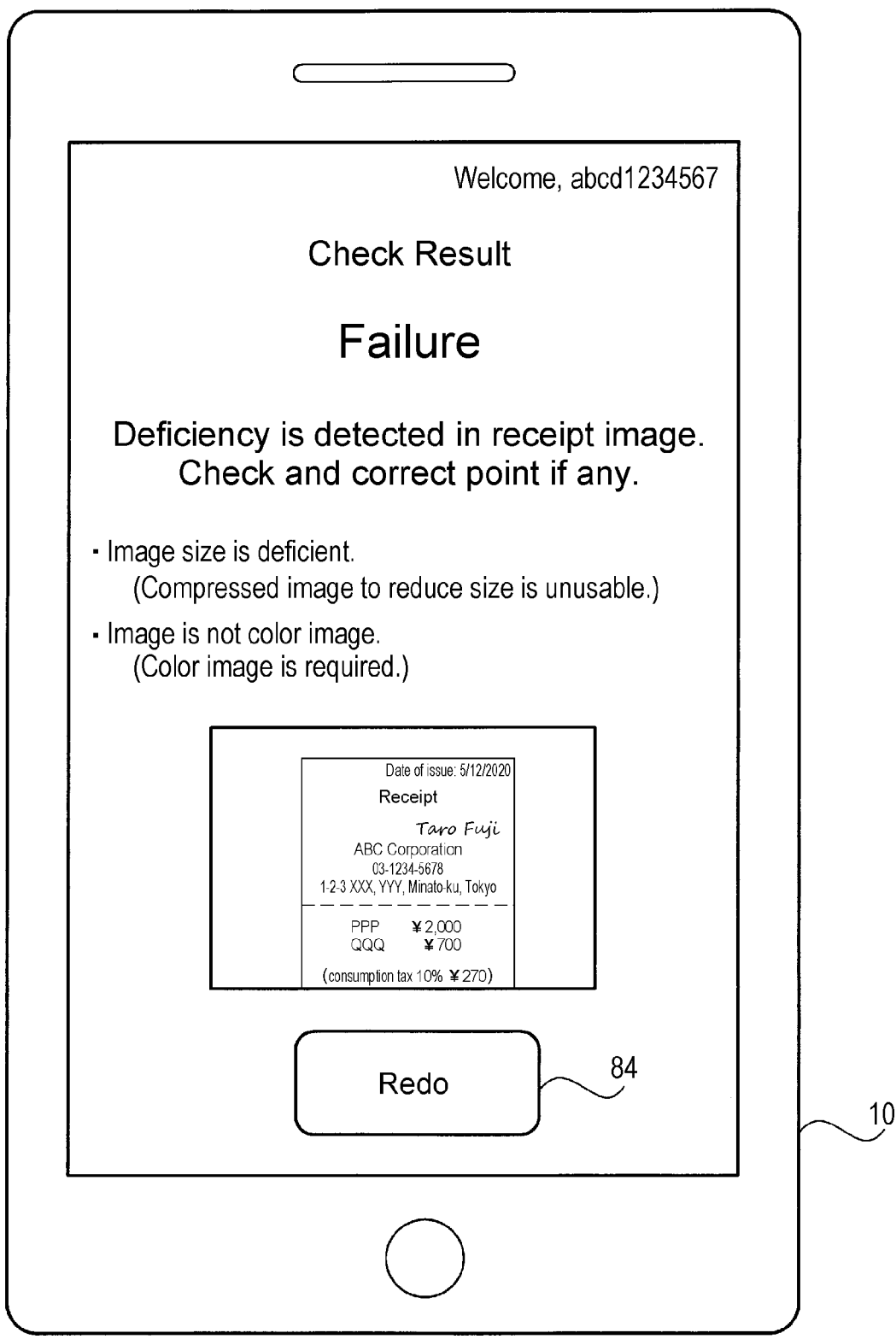
FIG. 16 is a view illustrating an example display screen displayed on the terminal apparatus when it is determined that the requirement verified using the non-AI processing is not satisfied.

FIG. 16 illustrates an example display screen of the terminal apparatus 10 displayed if it is determined that the requirements verified using the non-AI processing are not satisfied after the switching between the displaying and not displaying the Forcibly upload button 82 is performed on the basis of the criteria as described above.

In the example display screen illustrated in FIG. 16, the requirements verified using the non-AI processing "number of pixels is 3.88 M or more" and "image is not monochrome image" are displayed. It is understood that the Forcibly upload button 82 is not displayed compared to the example display screen illustrated in FIG. 11.

In this case, the user is not allowed to give a forced upload instruction. The user selects a Redo button 84 and redoes selection of an image.

In the description for this exemplary embodiment, the AI processing required for the verification process is executed by the AI processing server 30, instead of the check server 20. However, if the check server 20 has a function of the AI processing, the check server 20 may execute the AI processing required for the verification process.

In the description for this exemplary embodiment, the check server 20 executes the verification process for verifying whether the receipt image satisfies the requirements based on the LCMAB. However, the terminal apparatus 10 may execute the verification process by itself.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a memory; and
    a processor configured to:
        acquire an image of a digitized document,
        execute a first verification process by using image processing using artificial intelligence, the first verification process verifying whether a first requirement is satisfied, the first requirement being a specific requirement among a plurality of requirements that are required when the acquired image of the document is stored;
        execute a second verification process by using a determination process not using the artificial intelligence, the second verification process verifying whether a second requirement among the plurality of requirements is satisfied, the second requirement being other than the first requirement;
        execute the first verification process and the second verification process in parallel and independently from each other; and
        display a processing execution button for executing subsequent processing in response to obtaining a processing result indicating that the first requirement and the second requirement are both satisfied.

2. The information processing apparatus according to claim 1,
    wherein the processor is configured to, in response to obtaining a processing result indicating that the first requirement or the second requirement is not satisfied, display a detail of the unsatisfied first or second requirement and display a forced execution button for executing the subsequent processing.

3. The information processing apparatus according to claim 1,
    wherein the processor is configured to,
        in response to obtaining a processing result indicating that the first requirement is satisfied but the second requirement is not satisfied, display a detail of the unsatisfied second requirement and not to display a forced execution button for executing the subsequent processing, and,
        in response to obtaining a processing result indicating that the second requirement is satisfied but the first requirement is not satisfied, display a detail of the unsatisfied first requirement and display the forced execution button for executing the subsequent processing.

4. The information processing apparatus according to claim 2,
    wherein the processor is configured to:
        display an alert screen and a confirmation button in response to operation of the forced execution button, the alert screen being displayed to report, to a user, a situation possibly occurring in response to executing the subsequent processing of a deficient image, the confirmation button being displayed to confirm that the user intends to execute the subsequent processing; and
        allow the subsequent processing to be executed in response to operation of the confirmation button.

5. The information processing apparatus according to claim 3,
    wherein the processor is configured to:
        display an alert screen and a confirmation button in response to operation of the forced execution button, the alert screen being displayed to report, to a user, a situation possibly occurring in response to executing the subsequent processing of a deficient image, the confirmation button being displayed to confirm that the user intends to execute the subsequent processing; and
        allow the subsequent processing to be executed in response to operation of the confirmation button.

6. The information processing apparatus according to claim 1,
    wherein the image of the document is the image of a receipt, and the first requirement and the second requirement are based on the Law for Computerized Maintenance of Account Books.

7. The information processing apparatus according to claim 2,
    wherein the image of the document is the image of a receipt, and the first requirement and the second requirement are based on the Law for Computerized Maintenance of Account Books.

8. The information processing apparatus according to claim 3,
    wherein the image of the document is the image of a receipt, and the first requirement and the second requirement are based on the Law for Computerized Maintenance of Account Books.

9. The information processing apparatus according to claim 4,
wherein the image of the document is the image of a receipt, and the first requirement and the second requirement are based on the Law for Computerized Maintenance of Account Books.

10. The information processing apparatus according to claim 5,
wherein the image of the document is the image of a receipt, and the first requirement and the second requirement are based on the Law for Computerized Maintenance of Account Books.

11. The information processing apparatus according to claim 1,
wherein the first requirement includes at least one of requirements that the acquired image of the receipt has an autograph of an applicant, that a predetermined number of days have not passed since a date of issue of the receipt, and that the image of the receipt is not deficient.

12. The information processing apparatus according to claim 2,
wherein the first requirement includes at least one of requirements that the acquired image of the receipt has an autograph of an applicant, that a predetermined number of days have not passed since a date of issue of the receipt, and that the image of the receipt is not deficient.

13. The information processing apparatus according to claim 3,
wherein the first requirement includes at least one of requirements that the acquired image of the receipt has an autograph of an applicant, that a predetermined number of days have not passed since a date of issue of the receipt, and that the image of the receipt is not deficient.

14. The information processing apparatus according to claim 4,
wherein the first requirement includes at least one of requirements that the acquired image of the receipt has an autograph of an applicant, that a predetermined number of days have not passed since a date of issue of the receipt, and that the image of the receipt is not deficient.

15. The information processing apparatus according to claim 5,
wherein the first requirement includes at least one of requirements that the acquired image of the receipt has an autograph of an applicant, that a predetermined number of days have not passed since a date of issue of the receipt, and that the image of the receipt is not deficient.

16. The information processing apparatus according to claim 1,
wherein the second requirement includes at least one of requirements that the number of pixels of the acquired image of the receipt is a predetermined value or more and that the image of the receipt is not a monochrome image.

17. The information processing apparatus according to claim 2,
wherein the second requirement includes at least one of requirements that the number of pixels of the acquired image of the receipt is a predetermined value or more and that the image of the receipt is not a monochrome image.

18. The information processing apparatus according to claim 3,
wherein the second requirement includes at least one of requirements that the number of pixels of the acquired image of the receipt is a predetermined value or more and that the image of the receipt is not a monochrome image.

19. The information processing apparatus according to claim 4,
wherein the second requirement includes at least one of requirements that the number of pixels of the acquired image of the receipt is a predetermined value or more and that the image of the receipt is not a monochrome image.

20. A non-transitory computer readable medium storing a program causing a computer to execute a process comprising:
acquiring an image of a digitized document;
executing a first verification process by using image processing using artificial intelligence, the first verification process verifying whether a first requirement is satisfied, the first requirement being a specific requirement among a plurality of requirements that are required when the acquired image of the document is stored;
executing a second verification process by using a determination process not using the artificial intelligence, the second verification process verifying whether a second requirement among the plurality of requirements is satisfied, the second requirement being other than the first requirement;
executing the first verification process and the second verification process in parallel and independently from each other; and
displaying a processing execution button for executing subsequent processing in response to obtaining a processing result indicating that the first requirement and the second requirement are both satisfied.

* * * * *